United States Patent [19]
Hicks

[11] Patent Number: 4,655,313
[45] Date of Patent: Apr. 7, 1987

[54] VEHICLE SEAT SWITCH
[75] Inventor: John E. Hicks, Licoln, Nebr.
[73] Assignee: Outboard Marine Corporation, Waukegan, Ill.
[21] Appl. No.: 769,486
[22] Filed: Aug. 26, 1985
[51] Int. Cl.$^4$ ............................................. B60K 25/00
[52] U.S. Cl. ..................................... 180/273; 200/34; 200/85 A
[58] Field of Search ................ 180/273; 200/34, 85 A

[56] References Cited
U.S. PATENT DOCUMENTS

| | | | |
|---|---|---|---|
| 1,891,998 | 12/1932 | Nafziger | 180/273 |
| 2,866,862 | 12/1958 | Bachi | 200/34 |
| 3,040,842 | 6/1962 | Charbonneau | 188/95 |
| 3,045,076 | 7/1962 | Gaylord | 200/34 |
| 3,081,846 | 3/1963 | Lift | 188/94 |
| 3,268,675 | 8/1966 | Willcox | 200/34 |
| 3,585,321 | 6/1971 | Dennison | 200/34 |
| 3,797,616 | 3/1974 | Faffart et al. | 188/298 |
| 3,940,581 | 2/1976 | Dörr | 200/85 A |
| 4,466,504 | 8/1984 | Giandenoto | 180/273 |
| 4,509,614 | 4/1985 | Bando et al. | 180/273 |

Primary Examiner—Richard A. Bertsch
Attorney, Agent, or Firm—Michael, Best & Friedrich

[57] ABSTRACT

A vehicle seat switch apparatus comprising a frame adapted to be mounted beneath a vehicle seat, a first member supported by the frame for generally reciprocal vertical movement relative to the frame between upper and lower positions, the first member having an upper end adapted to be contacted by the vehicle seat to move the first member to the lower position in response to movement of the seat caused by the weight of a vehicle operator on the seat, a spring for biasing the first member to the upper position, a switch mounted on the frame and adapted to be connected to an ignition circuit for opening and closing the circuit, the switch including a plunger movable upwardly and downwardly for respectively opening and closing the switch, and a second member for closing the switch in response to location of the first member in the lower position and for opening the switch after expiration of a predetermined period of time after the first member moves upwardly from the lower position.

25 Claims, 6 Drawing Figures

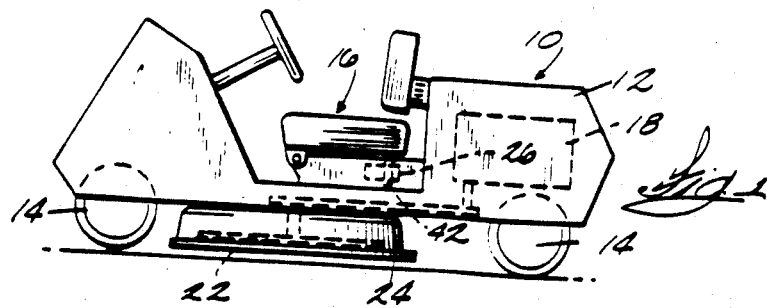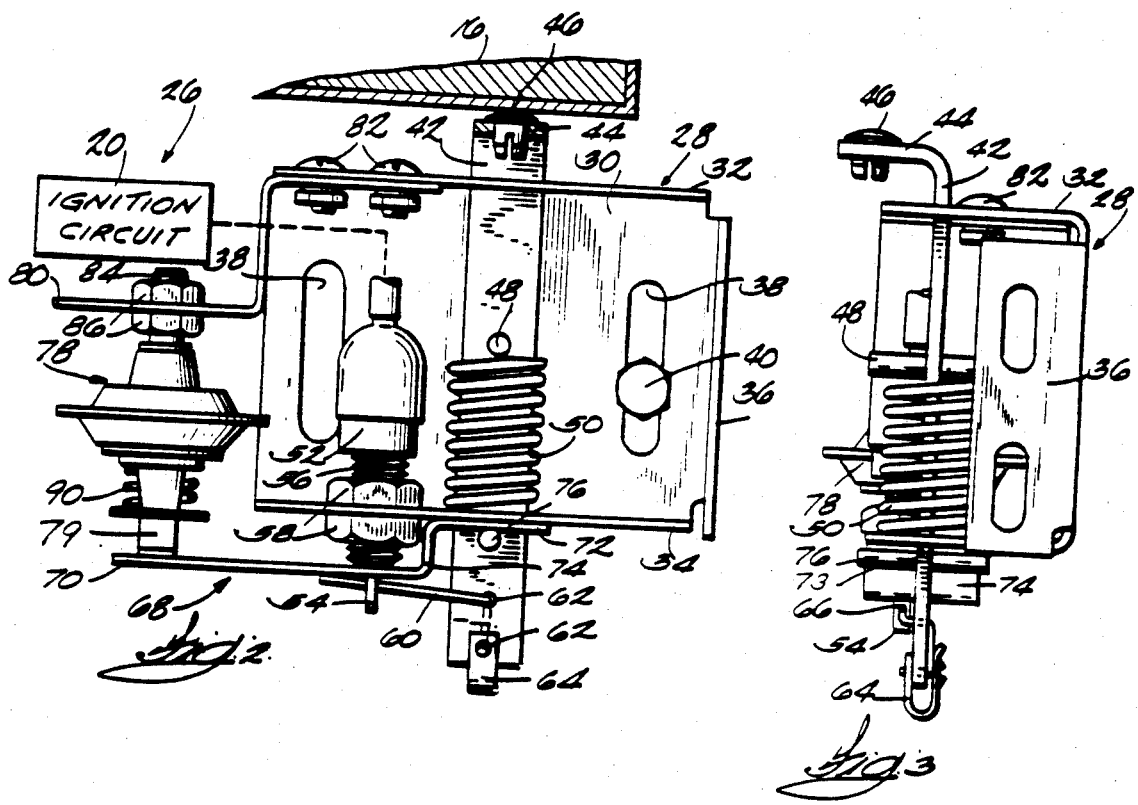

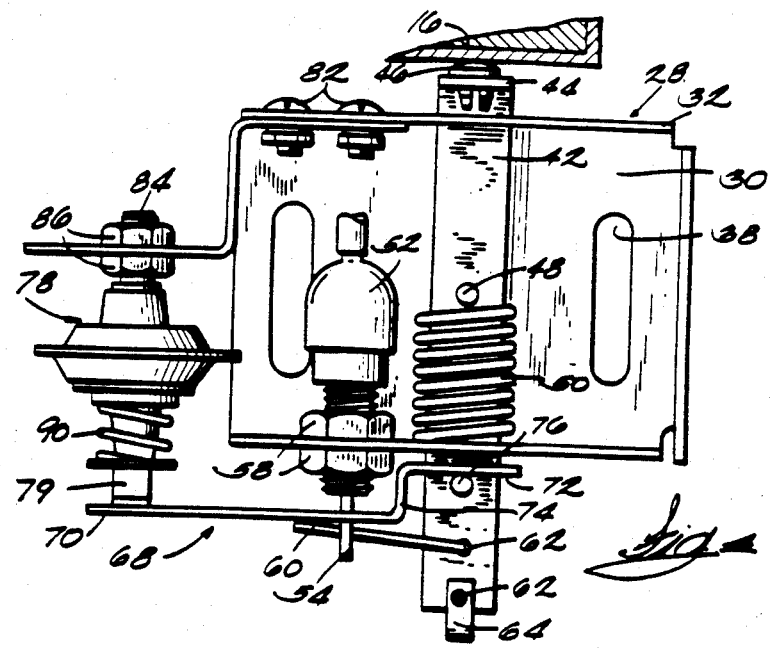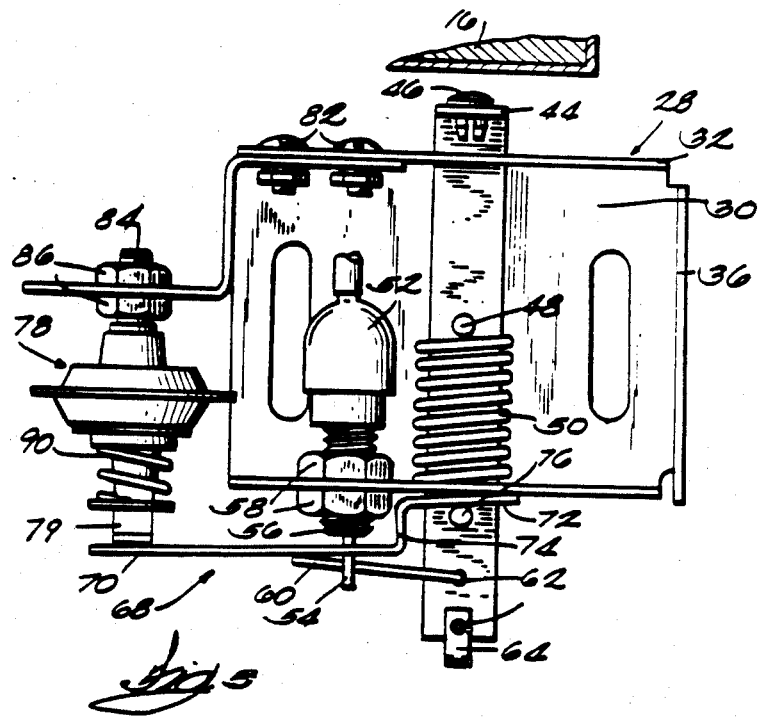

VEHICLE SEAT SWITCH

BACKGROUND OF THE INVENTION

The invention relates to vehicle seat switch apparatus, and more particularly to apparatus for opening the ignition circuit of a vehicle when the operator of the vehicle leaves the operator's seat.

Attention is directed to the following U.S. patents:

| Inventor's Name | U.S. Pat. No. | Issue Date |
| --- | --- | --- |
| Nafziger | 1,891,998 | Dec. 27, 1932 |
| Bachi | 2,866,862 | Dec. 30, 1958 |
| Charbonneau | 3,040,842 | June 26, 1962 |
| Gaylord | 3,045,076 | July 17, 1962 |
| Lift | 3,081,846 | March 19, 1963 |
| Willcox | 3,268,675 | Aug. 23, 1966 |
| Dennison | 3,585,321 | June 15, 1971 |
| Faffart | 3,797,616 | March 19, 1974 |
| Dorr | 3,940,581 | Feb. 24, 1976 |

SUMMARY OF THE INVENTION

The invention provides a lawn mower including a main body supported by a plurality of wheels, an operator's seat movably mounted on the main body, an engine mounted on the main body, an ignition circuit operably connected to the engine, a cutter blade driven by the engine, a blade housing surrounding the cutter blade, and a vehicle seat switch apparatus. The apparatus comprises a frame mounted beneath the seat, a first member supported by the frame for generally reciprocal vertical movement relative to the frame between upper and lower positions, the first member having an upper end adapted to be contacted by the seat to move the first member to the lower position in response to movement of the seat caused by the weight of an operator on the seat, means for biasing the first member to the upper position, a switch mounted on the frame and connected to the ignition circuit for opening and closing the circuit, and means for closing the switch in response to location of the first member in the lower position and for opening the switch after expiration of a predetermined period of time after the first member moves upwardly from the lower position.

The invention also provides a vehicle seat switch apparatus comprising a frame adapted to be mounted beneath a vehicle seat which is mounted for vertical movement, a first member supported by the frame for generally reciprocal vertical movement relative to the frame between upper and lower positions, the first member having an upper end adapted to be contacted by the vehicle seat to move the first member to the lower position in response to movement of the seat caused by the weight of a vehicle operator on the seat, means for biasing the first member to the upper position, a switch mounted on the frame and adapted to be connected to an ignition circuit for opening and closing the circuit, the switch including a plunger movable upwardly and downwardly for respectively opening and closing the switch, and means for closing the switch in response to location of the first member in the lower position and for opening the switch after expiration of a predetermined period of time after the first member moves upwardly from the lower position, the means for closing and opening the switch including means connecting the first member to the plunger for moving the plunger downwardly in response to movement of the first member to the lower position.

In one embodiment, the connecting means includes a second member extending generally horizontally and having a first end connected to the first member for movement therewith, and an opposite second end connected to the plunger for movement therewith.

In one embodiment, the second member is resiliently flexible, and the means for closing and opening the switch includes means for delaying upward movement of the second end of the second member for the predetermined period of time after the first end of the second member moves upwardly with the first member.

In one embodiment, the delaying means includes a dashpot.

In one embodiment, the delaying means includes a third member extending above the second end of the second member for limiting upward movement of the second end of the second member, means for moving the third member downwardly relative to the frame in response to movement of the first member to the lower position, and means for moving the third member upwardly relative to the frame after expiration of the predetermined period of time after the first member moves upwardly from the lower position.

In one embodiment, the means for moving the third member downwardly includes means biasing the third member downwardly relative to the frame.

In one embodiment, the third member has a first end, and an opposite second end adjacent the first member, the switch is located intermediate the first and second ends of the third member, and the third member includes a portion extending adjacent the plunger and above the second end of the second member for limiting upward movement of the second end of the second member.

In one embodiment, the means for moving the third member upwardly after expiration of the predetermined period of time includes means engaging the second end of the third member for moving the third member upwardly with the first member, and means for delaying upward movement of the first end of the third member for the predetermined period of time after the first member moves upwardly.

In one embodiment, the means for delaying upward movement of the first end of the third member includes a dashpot mounted on the frame and engaging the third member.

In one embodiment, the means engaging the second end of the third member includes a pin extending generally horizontally from the first member beneath the second end of the third member.

In one embodiment, the portion of the third member has therein an opening, the plunger extends through the opening, and the second end of the second member is connected to the plunger beneath the portion of the third member.

The invention also provides a vehicle seat switch apparatus comprising a frame adapted to be mounted beneath a vehicle seat, a first member supported by the frame for generally reciprocal vertical movement relative to the frame between upper and lower positions, the first member having an upper end adapted to be contacted by the vehicle seat to move the first member to the lower position in response to movement of the seat caused by the weight of a vehicle operator on the seat, means for biasing the first member to the upper position, a switch mounted on the frame and adapted to be connected to an ignition circuit for opening and closing the circuit, and means for closing the switch in response to location of the first member in the lower position and for opening the switch after expiration of a predetermined period of time after the first member moves upwardly from the lower position, the means for closing and opening the switch including a second member extending generally horizontally and having a first end connected to the first member for movement therewith, and an opposite second end connected to the switch.

A principal feature of the invention is the provision of a vehicle seat switch apparatus comprising, in part, a switch including a plunger movable upwardly and downwardly for respectively opening and closing the switch, and means for closing the switch in response to location of a first member in a lower position and for opening the switch after expiration of a predetermined period of time after the first member moves upwardly from the lower position, the means for closing and opening the switch including means connecting the first member to the plunger for moving the plunger downwardly in response to movement of the first member to the lower position.

Another principal feature of the invention is the provision of a vehicle seat switch apparatus comprising, in part, a switch, and means for closing the switch in response to location of a first member in a lower position and for opening the switch after expiration of a predetermine period of time after the first member moves upwardly from the lower position, the means for closing and opening the switch including a second member extending generally horizontally and having a first end connected to the first member for movement therewith, and an opposite second end connected to the switch.

Other principal features and advantages of the invention will become apparent to those skilled in the art upon review of the following detailed description, claims, and drawings.

DESCRIPTION OF THE DRAWINGS

FIG. 1 is a side elevational view of a lawn mower embodying the invention.

FIG. 2 is an enlarged, side elevational view of the seat switch apparatus.

FIG. 3 is an end view of the seat switch apparatus.

FIG. 4 is a side elevational view of the seat switch apparatus.

FIG. 5 is a side elevational view of the seat switch apparatus.

FIG. 6 is a bottom view of the seat switch apparatus.

Before one embodiment of the invention is explained in detail, it is to be understood that the invention is not limited in its application to the details of construction and the arrangements of components set forth in the following description or illustrated in the drawings. The invention is capable of other embodiments and of being practiced or being carried out in various ways. Also, it is to be understood that the phraseology and terminology used herein is for the purpose of description and should not be regarded as limiting.

DESCRIPTION OF THE PREFERRED EMBODIMENT

A lawn mower 10 embodying the invention is illustrated in the drawings. As best shown in FIG. 1, the lawn mower 10 includes a main body 12 supported by a plurality of wheels 14, and an operator's seat 16 having a front end mounted on the main body 12 for pivotal movement relative to the main body 12 about a generally horizontal axis.

The lawn mower 10 also includes an engine 18 and an ignition circuit 20 (shown schematically in FIG. 2). The lawn mower 10 further includes a cutter blade 22 driven by the engine 18, and a blade housing 24 surrounding the cutter blade 22.

The lawn mower 10 also includes a vehicle seat switch apparatus 26 mounted on the main body 12 beneath the rear end of the seat 16. As best shown in FIG. 2, the apparatus 26 comprises a frame 28 mounted on the main body 12 of the lawn mower 10. In the illustrated construction, the frame 28 has a generally flat, vertically extending main portion 30, and upper, lower and right (as viewed in FIG. 2) flanges 32, 34 and 36, respectively, all extending at an angle of approximately 90° and in one direction (forwardly in FIG. 2) relative to the main portion 30. The main portion 30 of the frame 26 includes a Pair of generally vertically extending slots 38, and the frame 28 is mounted on the main body 12 of the lawn mower 10 by bolts 40 (only one is shown) extending through the slots 38. The vertical positioning of the frame 28 relative to the main body 12 of the lawn mower 10 can be adjusted by adjusting the position of the bolts 40 relative to the frame 28.

The apparatus 26 also comprises a first member 42 supported by the frame 28 for generally reciprocal vertical movement relative to the frame 28 between upper and lower positions. The upper Position is shown in FIG. 2 and the lower position is shown in FIG. 4. In the illustrated construction, the upper and lower flanges 32 and 34 of the frame 28 include aligned slots (not shown), and the first member 42 is a strap-like member extending through the slots. The upper end of the first member 42 is adapted to be contacted by the vehicle seat 16 to move the first member 42 to the lower position in response to downward movement of the seat 16 caused by the weight of the operator on the seat 16. In the preferred embodiment, the upper end of the first member 42 includes a forwardly extending flange 44 having mounted therein a wear plug 46 adapted to be contacted by the seat 16.

The apparatus 26 also comprises means for biasing the first member 42 to the upper position. While various suitable biasing means can be employed, in the preferred embodiment, the first member 42 has mounted thereon an upper pin 48, and the biasing means includes a spring 50 extending between the lower flange 34 and the upper pin 48.

The apparatus 26 further comprises a switch 52 mounted on the frame 28 and connected to the ignition circuit 20 for opening and closing the circuit 20. While various suitable switches can be used, in the preferred embodiment, the switch 52 includes a generally vertically extending plunger 54 movable upwardly and downwardly for respectively opening and closing the switch 52. In the illustrated construction, the switch 52 also includes an externally threaded portion 56 extending through the lower flange 34, and the switch 52 is secured to the frame 28 by a pair of bolts 58 threaded onto the externally threaded portion 56. The vertical positioning of the switch 52 relative to the frame 28 can be adjusted by adjusting the position of the bolts 58 relative to the externally threaded portion 56.

The apparatus 26 further comprises means for closing the switch 52 in response to location of the first member 42 in the lower position and for opening the switch 52 after expiration of a predetermined period of time after the first member 42 moves upwardly from the lower position. The predetermined period of time allows the operator to leave the seat 16 temporarily without having the ignition circuit 20 opened. For example, a relatively short predetermined period of time would allow the operator to bounce upwardly off the seat 16, such as might happen during operation of the lawn mower 10 on rough terrain, without opening the ignition circuit 20. A longer predetermined period of time would allow the operator to leave and return to the lawn mower 10.

While various suitable means for closing and opening the switch 52 can be used, in the preferred embodiment, the closing and opening means includes means connecting the first member 42 to the plunger 54 for moving the plunger 54 downwardly in response to movement of the first member 42 to the lower position.

While various suitable connecting means can be employed, in the illustrated construction, the connecting means includes a second member 60 extending generally horizontally and having a first or right end connected to the first member 42 for movement therewith, and an opposite second or left end connected to the plunger 54 for movement therewith.

In the preferred embodiment, the lower end of the first member 42 includes a pair of vertically spaced apertures 62, and the right end of the second member 60 is hooked through the apertures 62, as best shown in FIG. 3. The right end of the second member 60 is preferably also secured to the first member 42 by a clip 64. Furthermore, in the preferred embodiment, the plunger 54 has therein an aperture 66 (see FIG. 3), and the left end of the second member 60 extends through the aperture 66. Thus, vertical movement of the first member 42 causes corresponding vertical movement of the right end of the second member 60, and vertical movement of the left end of the second member 60 causes corresponding vertical movement of the plunger 54.

In the preferred embodiment, the second member 60 is resiliently flexible, and the means for closing and opening the switch 52 includes means for delaying upward movement of the second or left end of the second member 60 for the predetermined period of time after the first or right end of the second member 60 moves upwardly with the first member 42. While various suitable delaying means can be employed, in the preferred embodiment, the delaying means includes a third member 68 extending above the left end of the second member 60 for limiting upward movement of the left end of the second member 60, means for moving the third member 68 downwardly relative to the frame 28 in response to movement of the first member 42 to the lower position, and means for moving the third member 68 upwardly relative to the frame 28 after expiration of the predetermined period of time after the first member 42 moves upwardly from the lower position.

In the preferred embodiment, the third member 68 includes a generally horizontal lower left portion 70 having a first or left end, a generally horizontal upper right portion 72 having a second or right end, and a vertical intermediate portion 74 connecting the right and left portions. Preferably, the right end of the third member 68 extends adjacent the first member 42 and has therein a slot 73 (FIG. 3) through which the first member 42 extends. Furthermore, in the preferred embodiment, the left portion 70 of the third member 68 extends adjacent the plunger 54 and has therein an opening 75 (see FIG. 6) through which the plunger 54 extends. The second or left end of the second member 60 is connected to the plunger 54 beneath the left portion 70 of the third member 68.

While various suitable means for moving the third member 68 downwardly can be employed, in the illustrated construction, such means include means biasing the third member 68 downwardly relative to the frame 28.

While various suitable means for moving the third member 68 upwardly relative to the frame 28 after expiration of the predetermined period of time can be employed, in the preferred embodiment, such means includes means engaging the right end of the third member 68 for moving the third member 68 upwardly with the first member 42, and means for delaying upward movement of the left end of the third member 68 for the predetermined period of time after the first member 42 moves upwardly.

While various suitable means for engaging the right end of the third member 68 can be used, in the illustrated construction, such means includes a lower pin 76 extending generally horizontally from the first member 42 beneath the second or right end of the third member 68, and the lower flange 34 of the frame 28. Upward movement of the pin 76 with the first member 42 causes upward movement of the right end of the third member 68. As the right end of the third member 68 moves upwardly under the influence of the pin 76, the third member 68 pivots counterclockwise as seen in FIG. 5 relative to the frame 28. Upward movement of the right end of the third member 68 is limited by the flange 34. After the right end of the third member 68 contacts the flange 34, the flange 34 acts as a fulcrum for clockwise pivotal movement of the third member 68 and corresponding upward movement of the left end of the third member 68 caused by the upward force exerted on the third member 68 by the pin 76. In the absence of means for delaying upward movement of the left end of the third member 68, the left end of the third member 68 would move upwardly due to this pivotal movement once the right end of the third member 68 has contacted the flange 34.

While various suitable means for delaying upward movement of the left end of the third member 68 can be used, in the preferred embodiment, such means includes a dashpot 78 mounted on the frame 28 and including a downwardly extending rod 79 engaged with the left end of the third member 68. In the preferred embodiment, the rod 79 extends downwardly into abutment with the third member 68. In alternative embodiments, the rod 79 can be pivotally connected to the third member 68, or can be fixedly connected to the third member 68 and pivotally connected to the dashpot 78. The rod 79 is extendible and retractable relative to the dashpot 78. While some of the advantages of the invention can be obtained with a two-way dashpot, in the preferred embodiment the dashpot 78 is a one-way dashpot and only delays upward movement of the rod 79, allowing free downward movement of the rod 79.

In the illustrated construction, the dashpot 78 is mounted on a mounting bracket 80 which is in turn mounted on the upper flange 32 of the frame 28 by nuts and bolts 82. Preferably, the dashpot 78 includes an externally threaded portion 84 extending upwardly through the mounting bracket 80, and the dashpot 78 is secured to the mounting bracket 80 by a pair of bolts 86. Vertical positioning of the dashpot 78 relative to the mounting bracket 80 and to the frame 28 can be adjusted by adjusting the position of the bolts 86 relative to the externally threaded portion 84. In the preferred embodiment, the dashpot 78 is mounted on the left end of the frame 28, so that the switch 52 is located intermediate the dashpot 78 and the first member 42 and intermediate the first and second or left and right ends of the third member 68.

While various suitable means for biasing the third member 68 downwardly relative to the frame 28 can be employed, in the illustrated construction, the biasing means includes a spring 90 extending between the dashpot 78 and the rod 79 for biasing the rod 79 and therefore the left end of the third member 68 downwardly relative to the dashpot 78. The spring 90 is preferably substantially weaker than the spring 50 so that the third member 68 can Pivot clockwise as described above under the influence of the spring 50 (via the first member 42 and the pin 76) and against the force of the spring 90.

The apparatus operates as follows:

When no one is seated on the lawn mower 10, the apparatus 26 is as shown in FIG. 2. When the operator is seated, the seat 16 moves downwardly and causes downward movement of the first member 42 relative to the frame 28. The downward movement of the first member 42 causes downward movement of the lower pin 76, and this allows the third member 68 to move downwardly under the influence of the spring 90. At the same time, the downward movement of the first member 42 causes downward movement of the second member 60 which in turn causes downward movement of the plunger 54, thereby closing the ignition circuit 20. This stage of operation is illustrated in FIG. 4.

When the operator leaves the seat 16, the first member 42 is allowed to move upwardly under the influence of the spring 50. This upward movement of the first member 42 causes upward movement of the lower pin 76, thereby causing upward movement of the right end of the third member 68, and of the right end of the second member 60. This causes the third member 68 to pivot counterclockwise as seen in FIG. 5. Once the right end of the third member 68 contacts the flange 34, the pin 76 exerts a force on the third member 68 tending to pivot the third member 68 clockwise so as to cause the left end of the third member 68 to move upwardly. At this time, however, the dashpot 78 delays upward movement of the left end of the third member 68, and this causes the left portion 70 of the third member 68 to delay upward movement of the left end of the second member 60, and therefore of the plunger 54. Thus, the dashpot 78 delays opening of the switch 52. This stage of operation is illustrated in FIG. 5.

After expiration of the predetermined period of time, the dashpot 78 allows the third member 68 to pivot clockwise with the left end of the third member 68 moving upwardly to its original position, thereby allowing the second end of the second member 60 to return to its original position, and allowing the plunger 54 to move upwardly to open the switch 52.

Various features and advantages of the invention are set forth in the following claims.

I claim:

1. A lawn mower including a main body supported by a plurality of wheels, an operator's seat movably mounted on said main body, an engine mounted on said main body, an ignition circuit operably connected to said engine, a cutter blade driven by said engine, a blade housing surrounding said cutter blade, and a vehicle seat switch apparatus comprising a frame mounted beneath said seat, a first member supported by said frame for generally reciprocal vertical movement relative to said frame between upper and lower positions, said first member having an upper end adapted to be contacted by said seat to move said first member to said lower position in response to movement of said seat caused by the weight of an operator on said seat, means for biasing said first member to said upper position, a switch mounted on said frame and connected to said ignition circuit for opening and closing said circuit, and means for closing said switch in response to location of said first member in said lower position and for opening said switch after expiration of a predetermined period of time after said first member moves upwardly from said lower position.

2. A vehicle seat switch apparatus comprising a frame adapted to be mounted beneath a vehicle seat which is mounted for vertical movement, a first member supported by said frame for generally reciprocal vertical movement relative to said frame between upper and lower positions, said first member having an upper end adapted to be contacted by the vehicle seat to move said first member to said lower position in response to downward movement of the seat caused by the weight of a vehicle operator on the seat, means for biasing said first member to said upper position, a switch mounted on said frame and adapted to be connected to an ignition circuit for opening and closing the circuit, said switch including a plunger movable upwardly and downwardly for respectively opening and closing said switch, and means for closing said switch in response to location of said first member in said lower position and for opening said switch after expiration of a predetermined period of time after said first member moves upwardly from said lower position, said means for closing and opening said switch including means connecting said first member to said plunger for moving said plunger downwardly in response to movement of said first member to said lower position.

3. An apparatus as set forth in claim 2 wherein said connecting means includes a second member extending generally horizontally and having a first end connected to said first member for movement therewith, and an opposite second end connected to said plunger for movement therewith.

4. An apparatus as set forth in claim 3 wherein said second member is resiliently flexible, and wherein said means for closing and opening said switch includes means for delaying upward movement of said second end of said second member for said predetermined period of time after said first end of said second member moves upwardly with said first member.

5. An apparatus as set forth in claim 4 wherein said delaying means includes a dashpot.

6. An apparatus as set forth in claim 4 wherein said delaying means includes a third member extending above said second end of said second member for limiting upward movement of said second end of said second member, means for moving said third member downwardly relative to said frame in response to movement of said first member to said lower position, and means for moving said third member upwardly relative to said frame after expiration of said predetermined period of time after said first member moves upwardly from said lower position.

7. An apparatus as set forth in claim 6 wherein said means for moving said third member downwardly includes means biasing said third member downwardly relative to said frame.

8. An apparatus as set forth in claim 7 wherein said third member has a first end, and an opposite second end adjacent said first member, wherein said switch is located intermediate said first and second ends of said third member, and wherein said third member includes a portion extending adjacent said plunger and above said second end of said second member for limiting upward movement of said second end of said second member.

9. An apparatus as set forth in claim 8 wherein said means for moving said third member upwardly after expiration of said predetermined period of time includes means engaging said second end of said third member for moving said third member upwardly with said first member, and means for delaying upward movement of said first end of said third member for said predetermined period of time after said first member moves upwardly.

10. An apparatus as set forth in claim 9 wherein said means for delaying upward movement of said first end of said third member includes a dashpot mounted on said frame and engaging said third member.

11. An apparatus as set forth in claim 9 wherein said means engaging said second end of said third member includes a pin extending generally horizontally from said first member beneath said second end of said third member.

12. An apparatus as set forth in claim 8 wherein said portion of said third member has therein an opening, wherein said plunger extends through said opening, and wherein said second end of said second member is connected to said plunger beneath said portion of said third member.

13. A vehicle seat switch apparatus comprising a frame adapted to be mounted beneath a vehicle seat which is mounted for vertical movement, a first member supported by said frame for generally reciprocal vertical movement relative to said frame between upper and lower positions, said first member having an upper end adapted to be contacted by the vehicle seat to move said first member to said lower position in response to downward movement of the seat caused by the weight of a vehicle operator on the seat, means for biasing said first member to said upper position, a switch mounted on said frame and adapted to be connected to an ignition circuit for opening and closing the circuit, and means for closing said switch in response to location of said first member in said lower position and for opening said switch after expiration of a predetermined period of time after said first member moves upwardly from said lower position, said means for closing and opening said switch including a second member extending generally horizontally and having a first end connected to said first member for movement therewith, and an opposite second end connected to said switch.

14. An apparatus as set forth in claim 13 wherein said switch includes a plunger movable upwardly and downwardly for respectively opening and closing said switch.

15. An apparatus as set forth in claim 14 wherein said second member connects said first member to said plunger for moving said plunger downwardly in response to movement of said first member to said lower position.

16. An apparatus as set forth in claim 13 wherein said second member is connected to said switch such that downward movement of said second end of said second member closes said switch, and upward movement of said second end opens said switch, wherein said second member is resiliently flexible, and wherein said means for closing and opening said switch includes means for delaying upward movement of said second end of said second member for said predetermined period of time after said first end of said second member moves upwardly with said first member.

17. An apparatus as set forth in claim 16 wherein said delaying means includes a dashpot.

18. An apparatus as set forth in claim 16 wherein said delaying means includes a third member extending above said second end of said second member for limiting upward movement of said second end of said second member, means for moving said third member downwardly relative to said frame in response to movement of said first member to said lower position, and means for moving said third member upwardly relative to said frame after expiration of said predetermined period of time after said first member moves upwardly from said lower position.

19. An apparatus as set forth in claim 18 wherein said means for moving said third member downwardly includes means biasing said third member downwardly relative to said frame.

20. An apparatus as set forth in claim 19 wherein said third member has a first end, and an opposite second end adjacent said first member, wherein said switch is located intermediate said first and second ends of said third member, and wherein said third member includes a portion extending adjacent said plunger and above said second end of said second member for limiting upward movement of said second end of said second member.

21. An apparatus as set forth in claim 20 wherein said means for moving said third member upwardly after expiration of said predetermined period of time includes means engaging said second end of said third member for moving said third member upwardly with said first member, and means for delaying upward movement of said first end of said third member for said predetermined period of time after said first member moves upwardly.

22. An apparatus as set forth in claim 21 wherein said means for delaying upward movement of said first end of said third member includes a dashpot mounted on said frame and engaging said third member.

23. An apparatus as set forth in claim 21 wherein said means for preventing downward movement of said second end of said third member includes a pin extending generally horizontally from said first member beneath said second end of said third member.

24. An apparatus as set forth in claim 20 wherein said portion of said third member has therein an opening, wherein said plunger extends through said opening, and wherein said second end of said second member is connected to said plunger beneath said portion of said third member.

25. A vehicle seat switch apparatus comprising a vertically movable vehicle seat, a frame mounted beneath said vehicle seat, a first member supported by said frame for generally reciprocal vertical movement relative to said frame between upper and lower positions, said first member having an upper end adapted to be contacted by said vehicle seat to move said first member to said lower position in response to downward movement of said seat caused by the weight of a vehicle operator on said seat, means for biasing said first member to said upper position, a switch mounted on said frame and adapted to be connected to an ignition circuit for opening and closing the circuit, said switch including a plunger movable upwardly and downwardly for respectively opening and closing said switch, and means for closing said switch in response to location of said first member in said lower position and for opening said switch after expiration of a predetermined period of time after said first member moves upwardly from said lower position, said closing and opening means including a resiliently flexible second member having a first end connected to said first member for movement therewith, and an opposite second end connected to said plunger for movement therewith, a dashpot mounted on said frame such that said switch is located intermediate said first member and said dashpot, a third member having a first end pivotally connected to said dashpot so as to delay upward movement of said third member, an opposite second end extending adjacent said first member, and a central portion extending adjacent said plunger and above said second end of said second member for limiting upward movement of said second end of said second member, means for moving said third member downwardly relative to said frame in response to movement of said first member to said lower position, and a pin extending generally horizontally from said first member beneath said second end of said third member for preventing downward movement of said third member relative to said first member.

* * * * *